(12) United States Patent
Dean et al.

(10) Patent No.: US 7,017,787 B1
(45) Date of Patent: Mar. 28, 2006

(54) VEHICLE EATING ACCESSORY

(75) Inventors: Carolyn L. Dean, 340 Cienata Dr., Fullerton, CA (US) 92835; Damion J. Dean, 340 Cienata Dr., Fullerton, CA (US) 92835

(73) Assignees: Carolyn L. Dean, Fullerton, CA (US); Damion J. Dean, Fullerton, CA (US)

( * ) Notice: Subject to any disclaimer, the term of this patent is extended or adjusted under 35 U.S.C. 154(b) by 0 days.

(21) Appl. No.: 10/222,428

(22) Filed: Aug. 17, 2002

(51) Int. Cl.
*B60R 11/00* (2006.01)

(52) U.S. Cl. .............................. 224/275; 2/49.2; 24/7; 224/901.8; 224/932

(58) Field of Classification Search ................ 224/275, 224/277, 901.8, 932; 206/494, 812; 2/48, 2/49.1, 49.2, 50, 52; 24/7, 8, 9, 3.4
See application file for complete search history.

(56) References Cited

U.S. PATENT DOCUMENTS

| | | | |
|---|---|---|---|
| 1,393,577 A * | 10/1921 | Ryason | 24/7 |
| 1,864,281 A * | 6/1932 | Short | 24/7 |
| 2,287,581 A * | 6/1942 | Walker | 224/277 |
| 2,563,594 A * | 8/1951 | Faulkinbury | 24/3.4 |
| 3,026,999 A * | 3/1962 | Constantino | 224/277 |
| 3,900,154 A * | 8/1975 | Martin | 206/496 |
| 3,999,221 A * | 12/1976 | Hannigan | 2/49.1 |
| 5,107,545 A * | 4/1992 | Potter | 2/48 |
| 5,190,197 A * | 3/1993 | Novak | 224/901.8 |
| 5,875,490 A * | 3/1999 | Woodard et al. | 2/49.1 |
| 6,196,435 B1 * | 3/2001 | Wu | 224/901.8 |
| 6,212,683 B1 * | 4/2001 | Liebmann | 2/48 |

* cited by examiner

*Primary Examiner*—Gary E. Elkins

(57) ABSTRACT

A vehicle eating accessory that includes a pouch structure attachable to an interior passenger compartment structure of a vehicle and having an extendable protectant cover member that is extendably removable from the pouch structure and positionable over a clothing and/or lap area of a person eating and/or drinking in the vehicle; the vehicle eating accessory extendable protectant cover member including a clipping structure for securing the extendable protectant cover member in place and an elongated catching pouch formed along at least one perimeter edge thereof for catching crumbs and other dropped elements that may be dropped onto the cover member by a person while eating; the cover member may be reusable or may be disposable and replaceable with a new cover member; the pouch assembly may contain multiple cover members if desired.

4 Claims, 1 Drawing Sheet

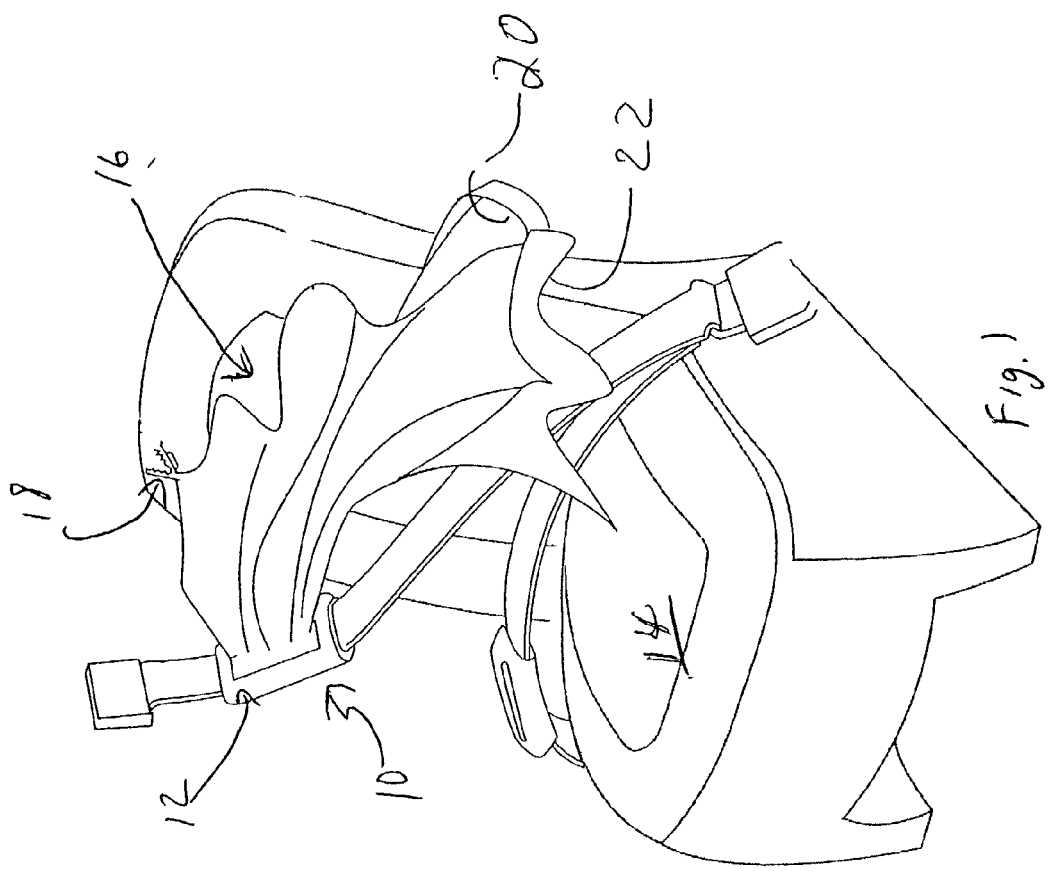
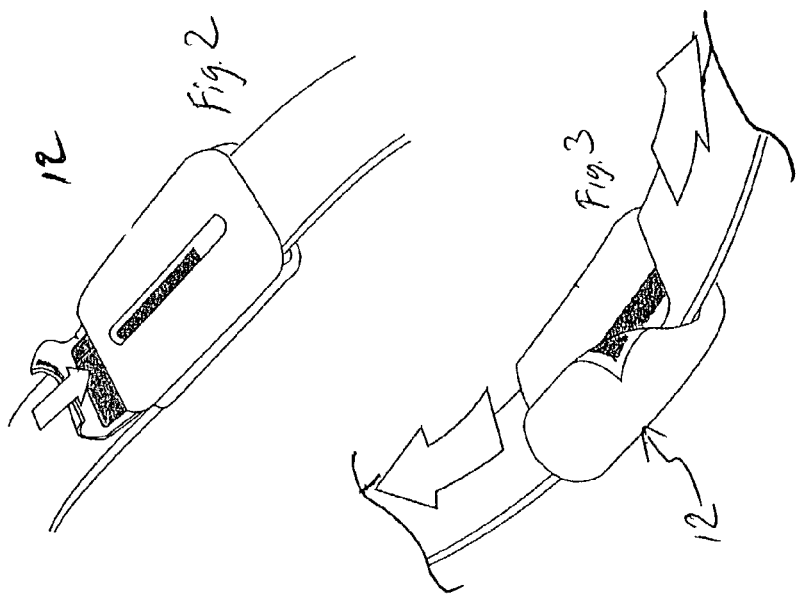

VEHICLE EATING ACCESSORY

TECHNICAL FIELD

The present invention relates to accessories for vehicles and more particularly to a vehicle eating accessory that includes a pouch structure attachable to an interior passenger compartment structure of a vehicle and having an extendable protectant cover member that is extendably removable from the pouch structure and positionable over a clothing and/or lap area of a person eating and/or drinking in the vehicle; the vehicle eating accessory extendable protectant cover member including a clipping structure for securing the extendable protectant cover member in place and an elongated catching pouch formed along at least one perimeter edge thereof for catching crumbs and other dropped elements that may be dropped onto the cover member by a person while eating; the cover member may be reusable or may be disposable and replaceable with a new cover member; the pouch assembly may contain multiple cover members if desired.

BACKGROUND ART

It is often troublesome when having small children or messy adults eating in a vehicle to protect the person's clothing and/or the interior of the vehicle from being stained by dropped food or beverages. It would be desirable, therefore, to have a vehicle eating accessory to catch dropped food items and spilled liquids.

GENERAL SUMMARY DISCUSSION OF INVENTION

It is thus an object of the invention to provide a vehicle eating accessory that includes a pouch structure attachable to an interior passenger compartment structure of a vehicle and having an extendable protectant cover member that is extendably removable from the pouch structure and positionable over a clothing and/or lap area of a person eating and/or drinking in the vehicle; the vehicle eating accessory extendable protectant cover member including a clipping structure for securing the extendable protectant cover member in place and an elongated catching pouch formed along at least one perimeter edge thereof for catching crumbs and other dropped elements that may be dropped onto the cover member by a person while eating; the cover member may be reusable or may be disposable and replaceable with a new cover member; the pouch assembly may contain multiple cover members if desired.

Accordingly, a vehicle eating accessory is provided. The vehicle eating accessory includes a pouch structure attachable to an interior passenger compartment structure of a vehicle and having an extendable protectant cover member that is extendably removable from the pouch structure and positionable over a clothing and/or lap area of a person eating and/or drinking in the vehicle; the vehicle eating accessory extendable protectant cover member including a clipping structure for securing the extendable protectant cover member in place and an elongated catching pouch formed along at least one perimeter edge thereof for catching crumbs and other dropped elements that may be dropped onto the cover member by a person while eating; the cover member may be reusable or may be disposable and replaceable with a new cover member; the pouch assembly may contain multiple cover members if desired.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a perspective view of an exemplary embodiment of the vehicle eating accessory extended and in use with a representative vehicle seat having a seat belt harness assembly.

FIG. 2 shows a side flap that is openable to allow a new cover member to be inserted into the pouch assembly.

FIG. 3 is an underside view of the pouch assembly showing the two-part hook and pile fastener used to attach it to a section of the seatbelt harness.

EXEMPLARY MODE FOR CARRYING OUT THE INVENTION

FIGS. 1–3 show various aspects of an exemplary embodiment of the vehicle eating accessory of the present invention generally designated 10. Vehicle eating accessory 10 includes a pouch structure, generally designated 12, attachable to an interior passenger compartment structure of a vehicle and having an extendable protectant cover member, generally designated 16, that is extendably removable from the pouch structure and positionable over a clothing and/or lap area of a person eating and/or drinking in the vehicle. The vehicle eating accessory extendable protectant cover member 16 includes a clipping structure, generally designated 18, for securing the extendable protectant cover member 16 in place and an elongated catching pouch 20 formed along at least one perimeter edge 22 thereof for catching crumbs and other dropped elements that may be dropped onto the cover member 16 by a person while eating. Cover member 16 may be reusable or may be disposable and replaceable with a new cover member 16. Pouch assembly 12 may contain multiple cover members 16, if desired.

It can be seen from the preceding description that a vehicle eating accessory has been provided.

It is noted that the embodiment of the vehicle eating accessory described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A vehicle eating accessory comprising:
   an elongated band having two opposing ends, each end having a fastener adjacent thereto, said band securely wrapped about a seat belt within a vehicle with the fasteners joined to form a pouch, said pouch having an upper surface with a dispensing aperture thereon;
   a protective cover member received within said pouch and extendable from said dispensing aperture for placement over a vehicle passenger to protect the passenger from spillage.

2. The vehicle eating accessory according to claim 1 further comprising means for attaching said cover member to a passenger.

3. The vehicle eating accessory according to claim 2 wherein said means for attaching said cover member to a passenger comprises a clip positioned thereon.

4. The vehicle eating accessory according to claim 3 wherein said cover member includes at least one peripheral edge having a catch lip formed thereon for trapping debris spilling onto the cover member preventing such debris from sliding onto a surrounding area.

* * * * *